(12) United States Patent
Forderhase

(10) Patent No.: US 7,207,584 B2
(45) Date of Patent: Apr. 24, 2007

(54) MOTORIZED BICYCLE DRIVE SYSTEM USING A STANDARD FREEWHEEL AND LEFT-CRANK DRIVE

(76) Inventor: Paul F. Forderhase, 3600 Hillbrook, Austin, TX (US) 78731

( * ) Notice: Subject to any disclaimer, the term of this patent is extended or adjusted under 35 U.S.C. 154(b) by 0 days.

(21) Appl. No.: 10/847,526

(22) Filed: May 17, 2004

(65) Prior Publication Data

US 2005/0039963 A1  Feb. 24, 2005

Related U.S. Application Data

(60) Provisional application No. 60/471,785, filed on May 20, 2003.

(51) Int. Cl.
*A63G 25/00* (2006.01)
(52) U.S. Cl. ........................ 280/205; 280/220; 280/207
(58) Field of Classification Search ................ 180/205, 180/220, 207
See application file for complete search history.

(56) References Cited

U.S. PATENT DOCUMENTS

| | | | | |
|---|---|---|---|---|
| 5,076,386 A | * | 12/1991 | Ferneding | .................... 180/205 |
| 5,242,028 A | * | 9/1993 | Murphy et al. | .............. 180/220 |
| 5,845,727 A | * | 12/1998 | Miyazawa et al. | ........... 180/205 |
| 6,352,131 B1 | * | 3/2002 | Lin et al. | ..................... 180/207 |
| 6,412,800 B1 | * | 7/2002 | Tommei | ...................... 280/220 |
| 6,554,730 B1 | * | 4/2003 | Sakai et al. | .................. 475/195 |
| 2003/0159869 A1 | * | 8/2003 | Trerice | ......................... 180/205 |

* cited by examiner

*Primary Examiner*—Lesley D. Morris
*Assistant Examiner*—Marlon Arce-Diaz
(74) *Attorney, Agent, or Firm*—Rick B. Yeager

(57) ABSTRACT

An auxiliary power system for a bicycle having a motor (10) attached to the bicycle flame (22) by thin clamps (30), which can be arranged in a variety of positions to avoid disturbing the control cables. Power is delivered on demand via a sprocket driving a single freewheel (180) attached to a modified left crank (200). The gearbox (20) may be attached to the frame by means of a quick-release system. A bushing (600), (700), (820) may be used instead of a modified as a means of mounting the freewheel to the crank axle. (720), (610), (850*b*). To prevent accidental simultaneous braking and triggering, triggering the system is accomplished by placing the trigger switch (430) so that the rider's fingers must disengage the brake in order to engage the motor. Accidental triggering may be prevented by placing a trigger switch on each handle and wiring them in series so that both switches must be engaged to obtain power.

3 Claims, 9 Drawing Sheets

MOTORIZED BICYCLE DRIVE SYSTEM USING A STANDARD FREEWHEEL AND LEFT-CRANK DRIVE

RELATED APPLICATIONS

This application is related to U.S. Provisional Patent Application No. 60/471,785 filed May 20, 2003, and claims the benefit of that Provisional Application.

FEDERALLY SPONSORED RESEARCH

Not Applicable

SEQUENCE LISTING OR PROGRAM

Not Applicable

BACKGROUND

1. Field of Invention

This invention relates to the field of motorized bicycle power systems, more specifically to electric systems driving the cranks of that bicycle.

BACKGROUND

2. Discussion of the Prior Art

There is an extensive body of patents that require extensive modification of the frame of the bicycle in order to assist the rider or to fully power the vehicle. The vast majority of these ingenious mechanisms are worthless if one is contemplating a modification of an existing machine. The modifications range from a radical redesign of the frame and transmission to a large and ungainly addition to the front or rear wheel. A few of the most notable innovations in the field of motorized bicycle drive systems include several systems driving the pedals, or cranks arms of the bicycle. The advantages of this approach are numerous, especially when taken in conjunction with a modern multi-speed bicycle.

"Pedelecs", as these systems are known, take advantage of the derailleur transmission system used by the rider. By driving the pedals through a suitable reduction gearbox, a Pedelec uses the derailleur system to keep the electric motor at the optimum speed to either produce maximum power, or operate at maximum efficiency. Murphy (U.S. Pat. No. 5,242,028), for example, describes a system in which two freewheels are used in conjunction with a motor, gearbox, and modified chain wheel crank in order to realize this advantage. The system described by Murphy allows power to be supplied by the rider or the motor. Rizzeto describes a similar system described (EP 0968911a1) in which a motor drives a modified chain ring assembly through a system having two freewheels. Rizzeto describes a system that has similar advantages in that power contributed by the rider and motor are independent. Both systems, however, are unnecessarily complex and expensive. Both systems require two freewheels, or overrunning clutches, and both systems require replacement of the chain rings attached to the pedals of the bicycle. This requirement not only requires a significant monetary expenditure on the part of the aspiring motorist, but also raises the possibility that extensive adjustment and debugging will be required to get the system to function properly, since it is well known that bicycle derailleur systems must be tuned and adjusted extensively. Any disturbance or replacement of part of the bicycle transmission is therefore undesirable.

Rizzeto describes a pedal crank that "is subject to high precision machining," and Murphy places a roller clutch at the critical core of his mechanism. Roller clutches are notoriously sensitive to the surface finish and cleanliness of the shaft against which they operate. Both Murphy and Rizzeto fail to mention how to accommodate the various control cable positions which are typically placed along the down tube of a bicycle having rear, and optionally, front derailleur or other gear change mechanisms. None of these liabilities are necessary. It is possible to greatly decrease the complexity and cost of the system while providing much of the benefit described by Murphy and Rizzeto.

OBJECTS AND ADVANTAGES

It is desirable to provide a motorized drive with a minimum of modifications to the bicycle. The current invention only replaces the left crank arm. Most of the prior art requires a specialized frame. The rider-driven chain ring set is not affected. The often sensitive and finely tuned front transmission system of the bicycle is undisturbed.

The power unit mounts easily to the down tube of a standard bicycle. The mounting is not sensitive to the tube diameter or shape. By using two constrictive clamps that attach to the gearbox with a single bolt each, this system provides a universal mounting scheme which accommodates any down tube geometry or diameter.

It is desirable to provide a mounting scheme that accommodates control cables placed by a wide variety of manufactures in any position along the down tube of the bicycle.

It is desirable to include highly integrated design features intended for volume manufacturing at low cost.

It is desirable to reduce cost and enhance reliability by the use of a standard single-speed bicycle freewheel of the type commonly found on "BMX" bicycles for the one-way clutch, and a left crank that fits the existing crank axle as the drive interface.

It is desirable to reduce drive complexity by only requiring one freewheel. By positively driving the crank axle, the current invention reduces the number of required freewheels to one, thus placing the system within the monetary reach of almost anyone who can afford a bicycle.

An alternative embodiment uses the crank arms of the bike, only adding an adapter to the left crank arm to provide a threaded boss for the single-speed freewheel.

SUMMARY

The invention comprises an electric motor connected by means of a suitable reduction method, such as a gearbox to a chain drive on the opposite side of the bicycle from the standard front chain rings. A single-speed freewheel, being threaded onto a modified left crank transmits power to the left pedal crank.

There is nothing about this mounting scheme that precludes the use of an expanding pin or cam arm to effect a quick release gearbox mounting. The design intent described is only to provide a flexible mounting to accommodate any position of control cables along the down tube.

DRAWINGS

Figure 6A:
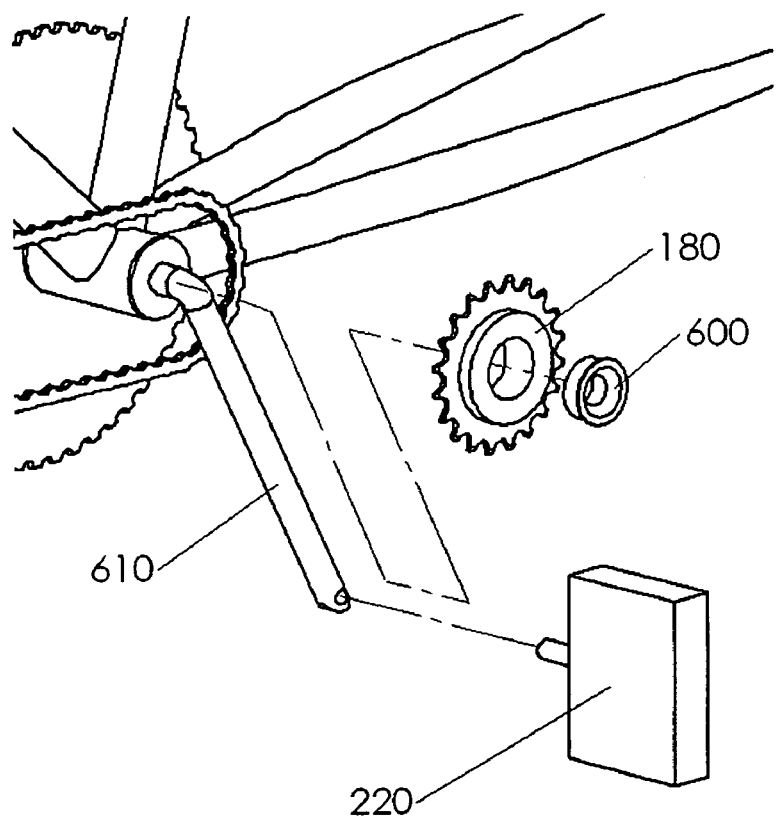
Figure 6B:
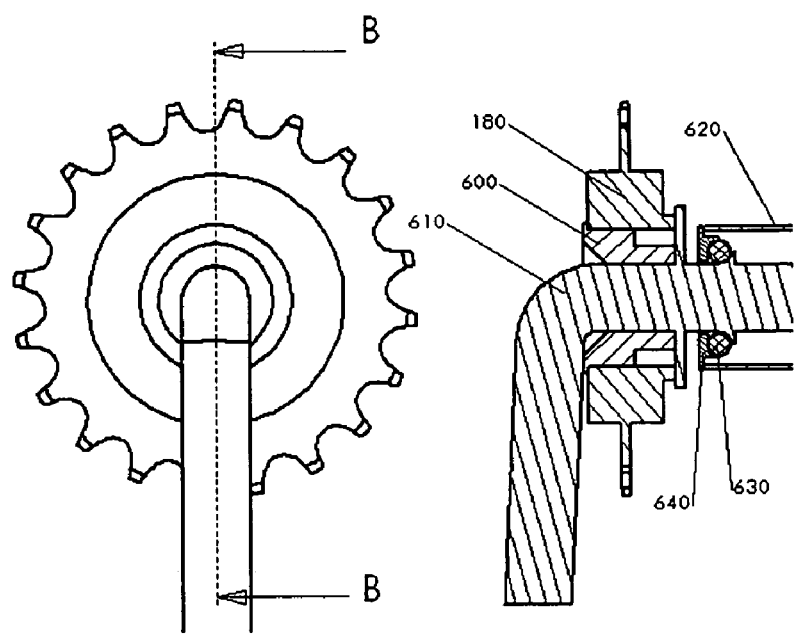
Figure 7A:
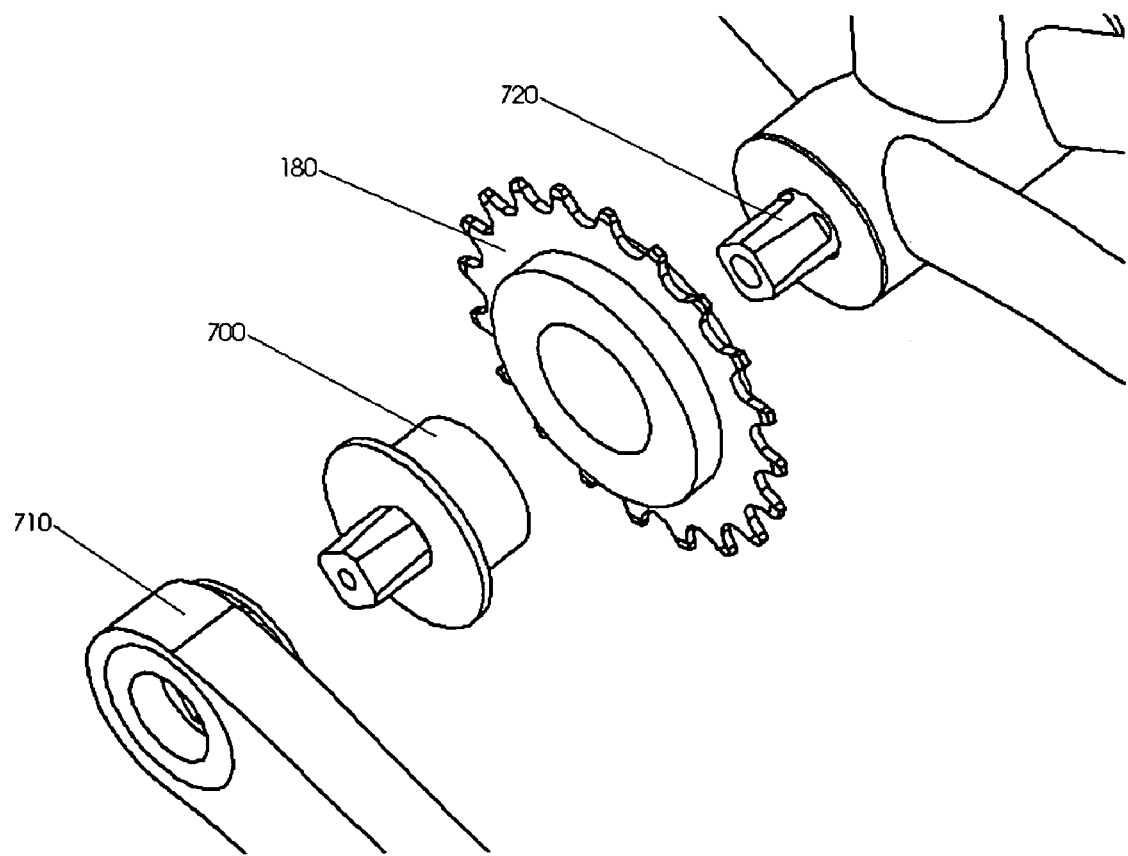
Figure 7B:
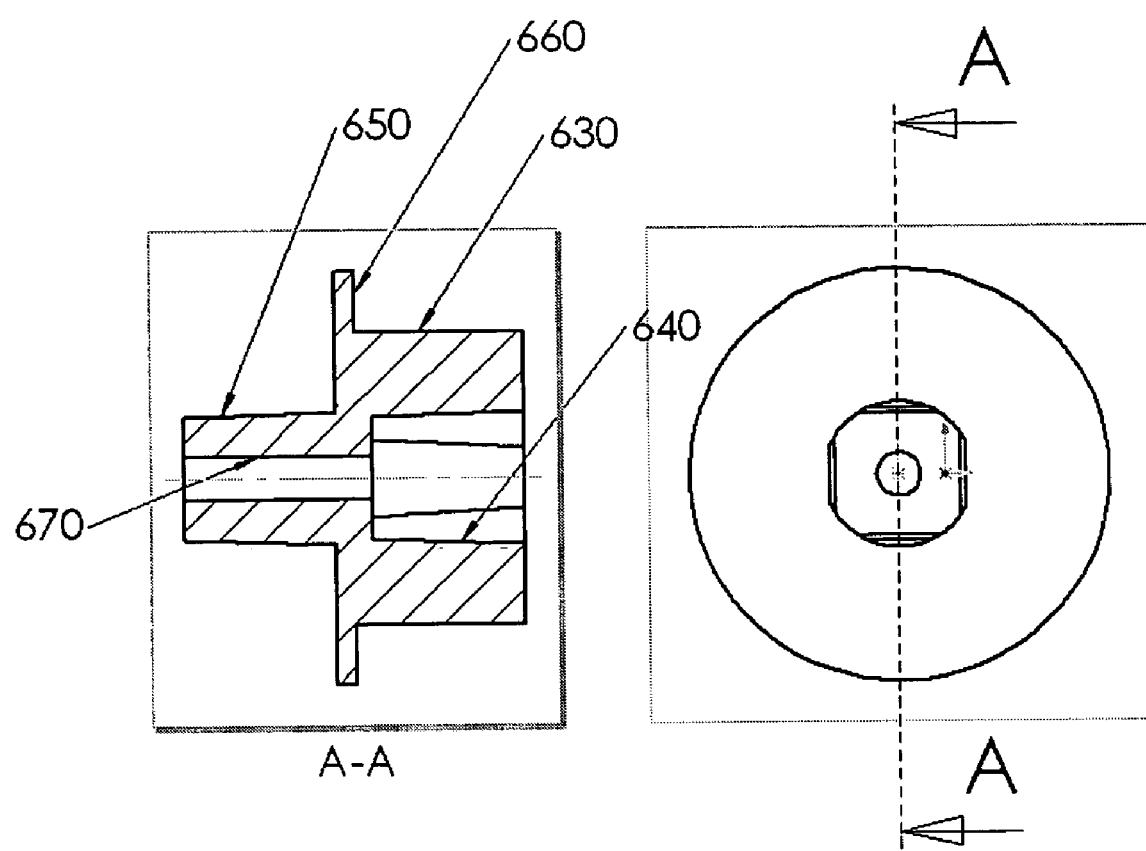

FIGS. 6a and 6b show views of an alternative embodiment for use on a single-piece crank system FIGS. 7a and 7b show views of an alternative embodiment for use on a cotterless crank FIGS. 8a and 8b show views of an alternative embodiment for use on a cottered crank.

DETAILED DESCRIPTION

Figure 1:
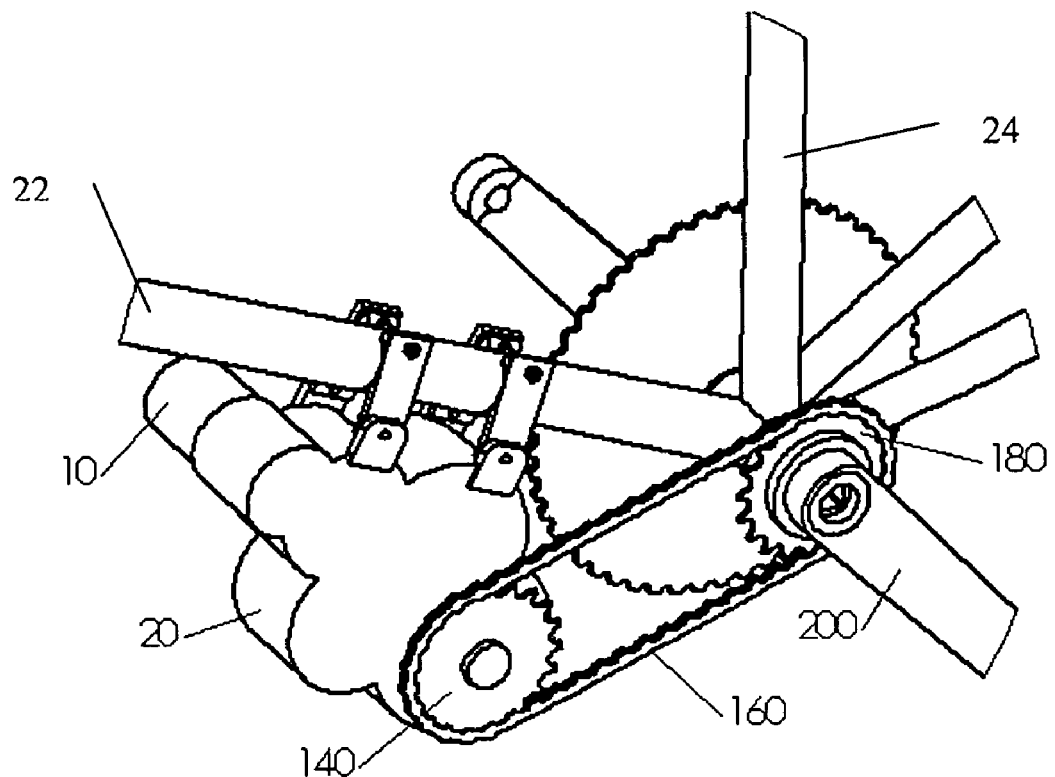
FIG. 1 shows a perspective view of the system installed on a bicycle frame.
Figure 2:
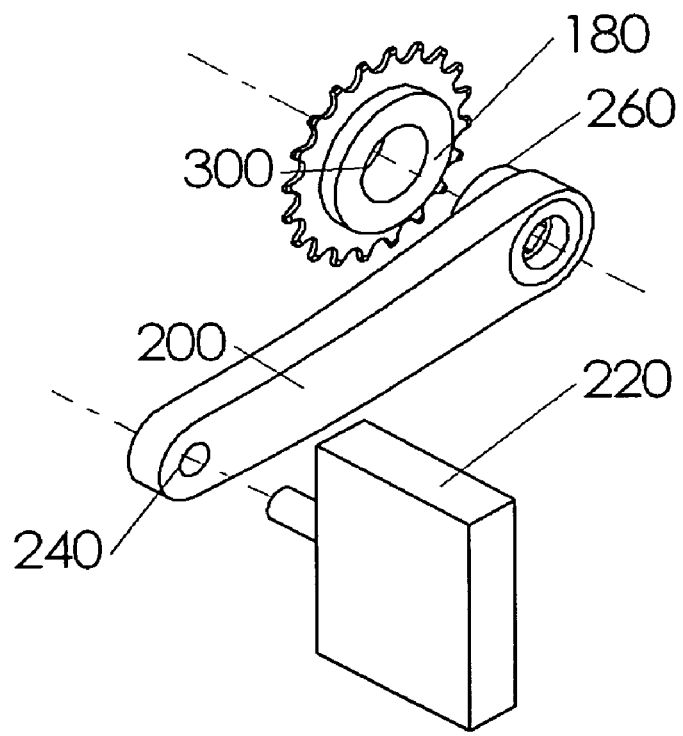
FIG. 2 shows an exploded view of a threaded crank arm carrying the freewheel.

An embodiment is shown in FIG. 1 and FIG. 2. Motor 10, is connected through a suitable reduction means such as a gear box housing 20 that provides a reduction in velocity and increase in torque to sprocket 140. Power is then transmitted through drive chain 160 to freewheel 180 threaded onto a crank 200. Crank 200 is threaded at hole 240 to accept a standard left pedal 220. This crank has a threaded boss 260 extending inwardly toward the center of the bike when mounted, the thread being sized to fit the female thread 300 of a single-speed freewheel 260. In this embodiment, the axis of the threaded boss 260 features the four-sided, tapered socket normally used to fasten "cotterless" style cranks to the crank axle.

The gearbox is fitted to the bicycle frame 24 either below or above the down tube 21 with an attachment means such as constrictive clamps such as the type shown in FIG. 3a–3d. In this example, the clamps are attached by brackets 120 to the gearbox at two points along the down tube of the bicycle. Bolts or quick release skewers through the gearbox housing may be used to attach the brackets.

Figure 3A:
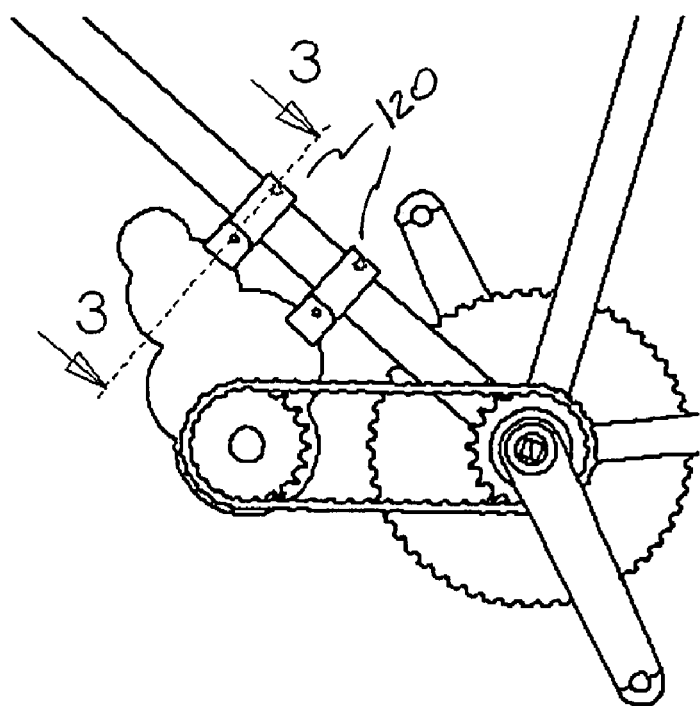
FIG. 3a shows the orientation and location of the section view used in FIGS. 3b, 3c, and 3d FIG. 3b through 3d show a family of clamp styles to accommodate a variety of control cable positions, down tube diameters, and down tube shapes.
Figure 3B:
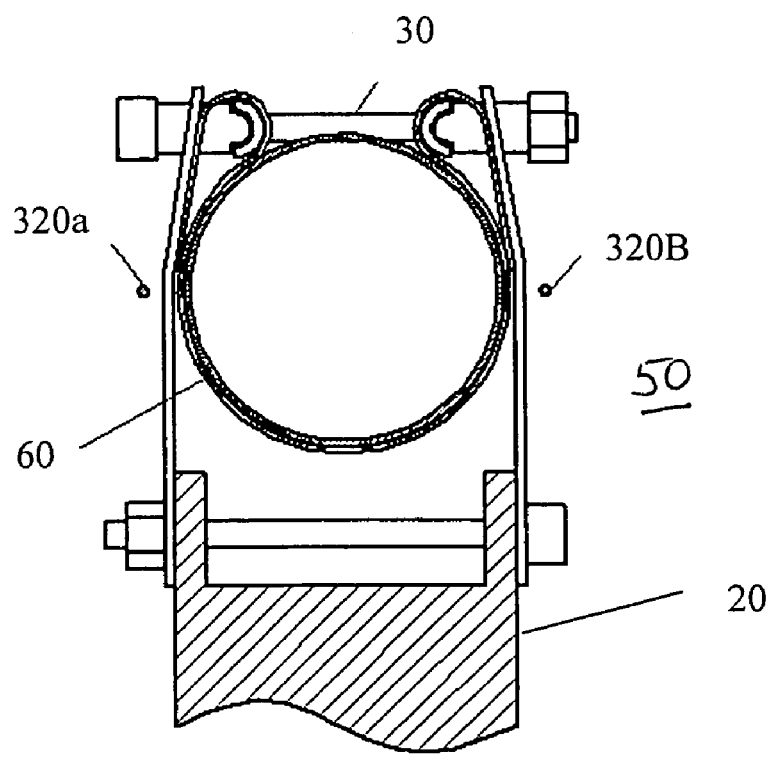
Figure 3C:
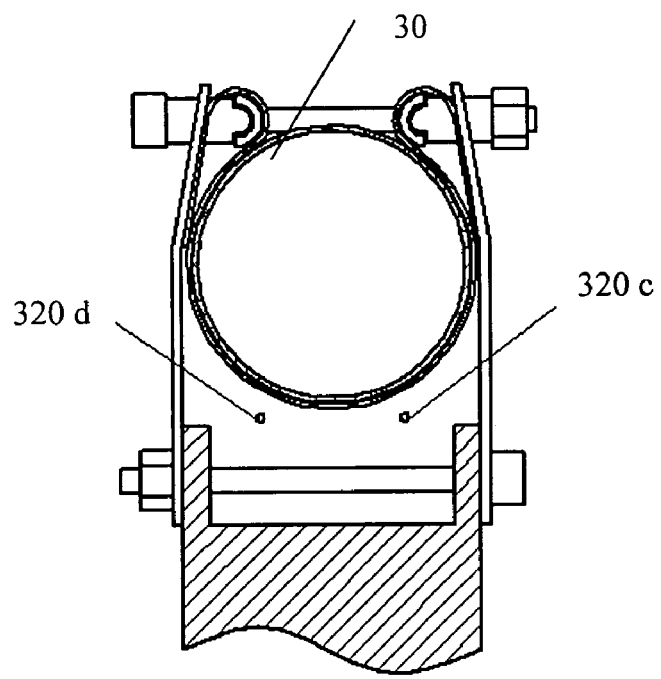
Figure 3D:
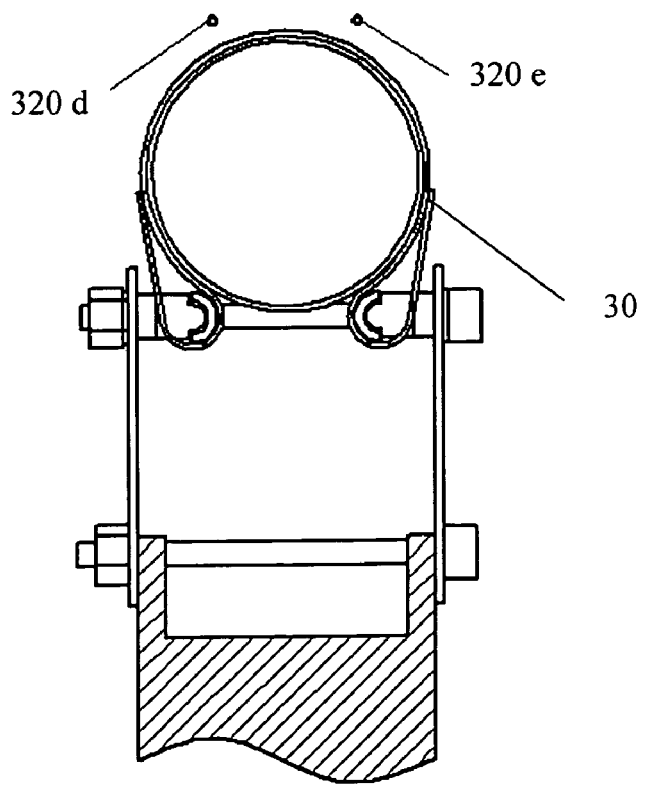

As it is impossible to predict the position used by a particular bicycle manufacturer for the placement of control cables that select which gear is engaged, the gearbox housing is attached to the down tube of the bicycle with a set of configurable clamps such as shown in FIG. 3b–3d. The position of the illustrating section is shown in FIG. 3a.

FIG. 3b shows an arrangement used for cables that run on either side of the down tube. The bracket set 50 is placed under each of the control cables, 320a and 320b. FIG. 3c shows a clamp arrangement used for cables that run under the down tube. In this case the cables run between the motor system and Clamp 30. Regardless of the control cable position, clamp 30 acts as a band brake, being a high-strength hose clamp of the kind manufactured by Mikalor S.A. (Spain). The high strength of this design allows it to resist the considerable torque about the axis of the tube developed by the auxiliary transmission during operation while having the low profile that is required to fit under the control cables as shown in FIG. 3a–3c.

Figure 4:
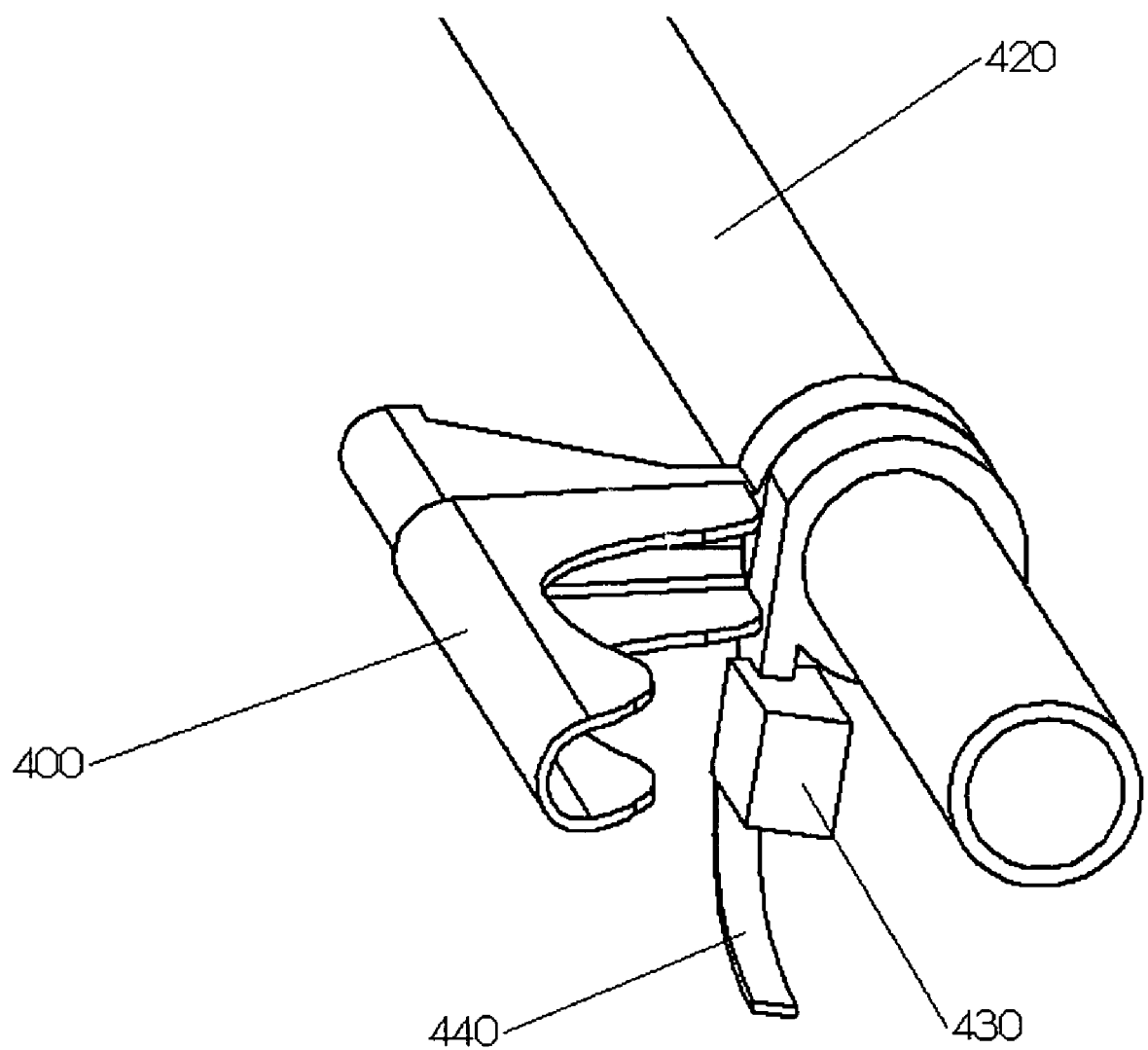
FIG. 4 shows one of two motor triggers on the trigger interlock system.

FIG. 4 shows a trigger switch placed on the bicycle handlebar in such a manner as to require the user to remove his hand from the bicycle brake lever. The brake lever and switch are placed on handlebar 420. Lever 440 of switch 430 is placed in a position that excludes the use of the brake when power is desired. In this case, the switch lever is below the brake lever. This replaces various elaborate exclusionary mechanisms that remove power from the motor whenever the motor is engaged. In this system, the exclusionary system is purely ergonomic. The rider must disengage the power system in order to engage the brake and vice versa.

In order to ensure that neither brake is engaged, it is expected that two trigger switches may be placed in series. Both triggers must be activated to supply power to the motor. This would prevent a panic stop where the rider mistakenly engages the motor with one hand and the brake with the other. This control scheme is similar to that of industrial equipment when both hands must be used to depress series-wired triggers. This control scheme eliminates the requirement for sophisticated torque sensors, throttle mechanisms, and the like. The user simply engages the system to provide power. If more power is required, the user switches to a higher gear. This lowers the speed of the motor and increases the power output at the expense of efficiency. If a greater range and efficiency is desired, the user switches to a lower gear. This increases the motor speed to its point of maximum efficiency.

Figure 5A:
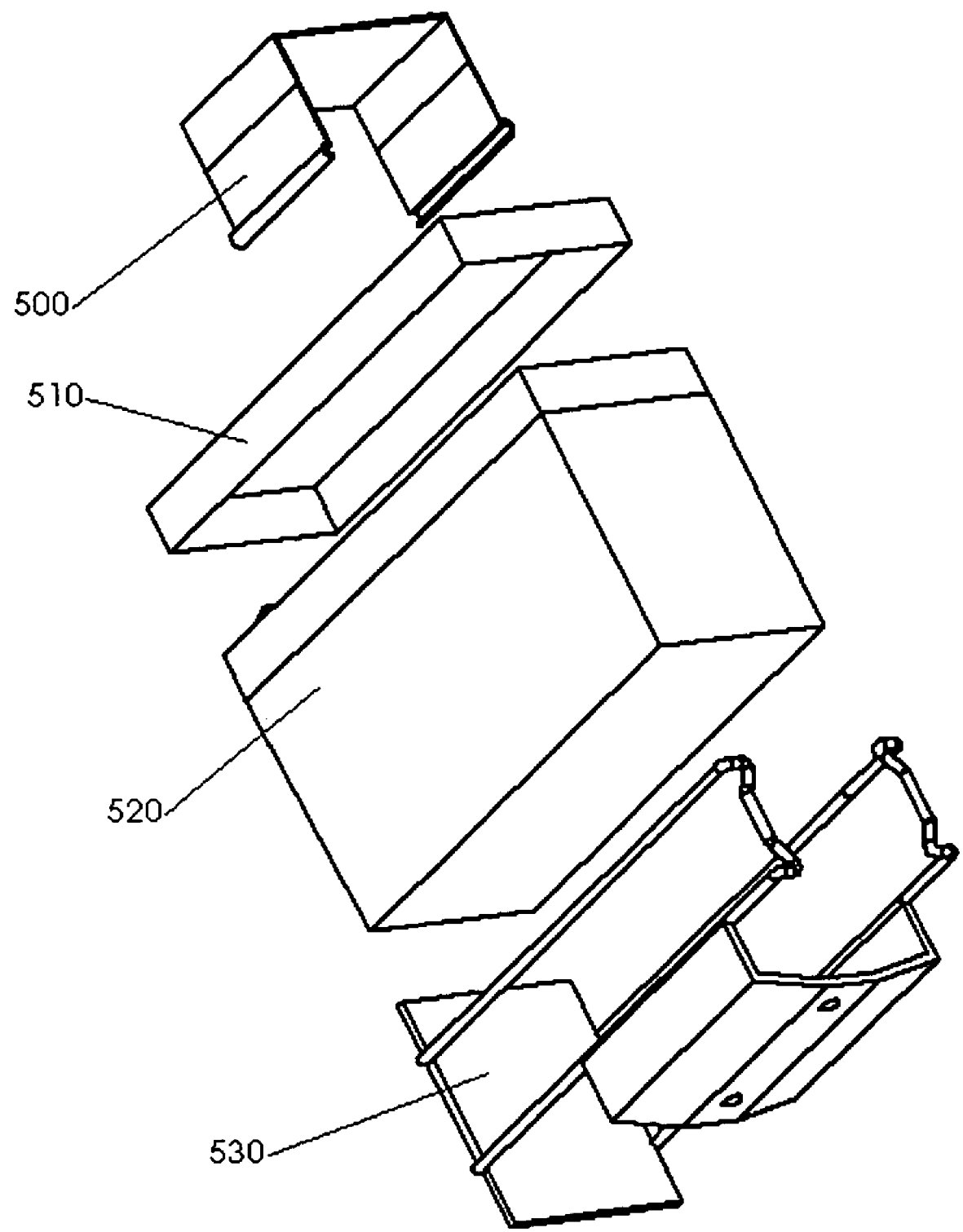
FIGS. 5a and 5b show both uses of a dual-purpose cage.
Figure 5B:
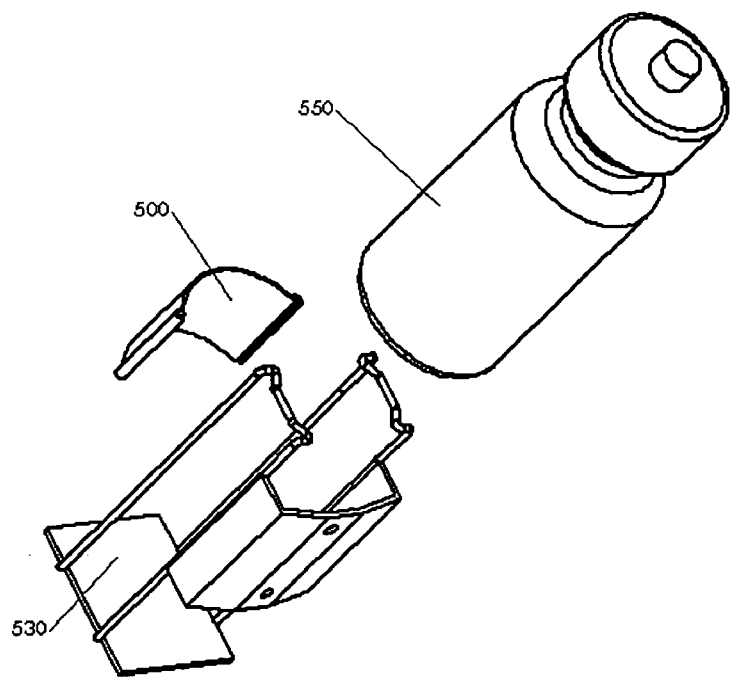

FIG. 5a and FIG. 5b show a dual-purpose water bottle cage that can accommodate both a water bottle and a 7 ah, 12 v lead-acid battery. In this example, wire assembly 530 may be similar in type to the water bottle cages in common use made of welded of formed wire. In this case, however, the cage is shaped to accommodate a 7.5 amp-hour lead-acid battery. FIG. 5a shows the cage being used to hold the battery 520. Elastomeric strap 500 retains moisture cap 510 which, in turn, fits over battery 520. Battery 520 fits into wire assembly 530. FIG. 5b shows the same cage being used to hold a water bottle 550. Elastomeric strap 500 engages the water bottle directly. It is also envisioned that the cage could be made of other materials and processes such as injection molded or vacuum formed plastic, or formed sheet metal. It is also envisioned that elastomeric strap 500 could be made of a rigid thermoplastic or metal being of a reversible design showing the profiles in FIGS. 5a and 5b facing-in opposite directions so that the part could be removed and reversed when the cage was converted from use as a battery holder to a water bottle cage and vice versa. It is also envisioned that the dual use concept could be extended to other battery housing styles.

Detailed Description of Embodiment—Bushing and Single-Piece Crank

FIGS. 6a and 6b show an alternate embodiment for use on a single-piece crank, also none as an "Ashtabula" crankset. The "parasitic" bushing 600 is threaded to engage the crank 610 on its inner diameter, and to accept the freewheel 180 on its outer diameter. Bushing 600 replaces the lock ring normally threaded to the outside of the bearing to adjust the axial play between bearing 630 and crank bearing cup 640. During assembly, pedal 220 is removed from crank 610, the bushing 600 and freewheel 180 are assembled to crank 610. Pedal 220 is then replaced. This alternative embodiment therefore does not require replacement of the crank set.

Detailed Description of Embodiment—Bushing and Cotterless Crank

FIGS. 7a and 7b show an alternative embodiment consisting of an extension bushing 700. This system is intended for use in cotterless crank systems such as the type described in the preferred embodiment. Freewheel 180 is threaded onto the inside of bushing 700. Crank 710 fits onto extension bushing 700, and the assembly is assembled to axle 720 with the same diameter bolt used originally, but with a longer length to accommodate the bushing. Detail of extension bushing is shown in FIG. 7b. The bushing is fitted with a clearance hole 670 to accommodate the bolt fixing crank 710 to axle 720. Shoulder 660 and threaded portion 630 engage freewheel 180. Four-sided socket 640 engages axle 720. As with the embodiment shown in FIGS. 6a and 6b, this embodiment does not require replacement of the crank.

Detailed Description of Embodiment—Bushing and Cottered Crank

Figure 8:
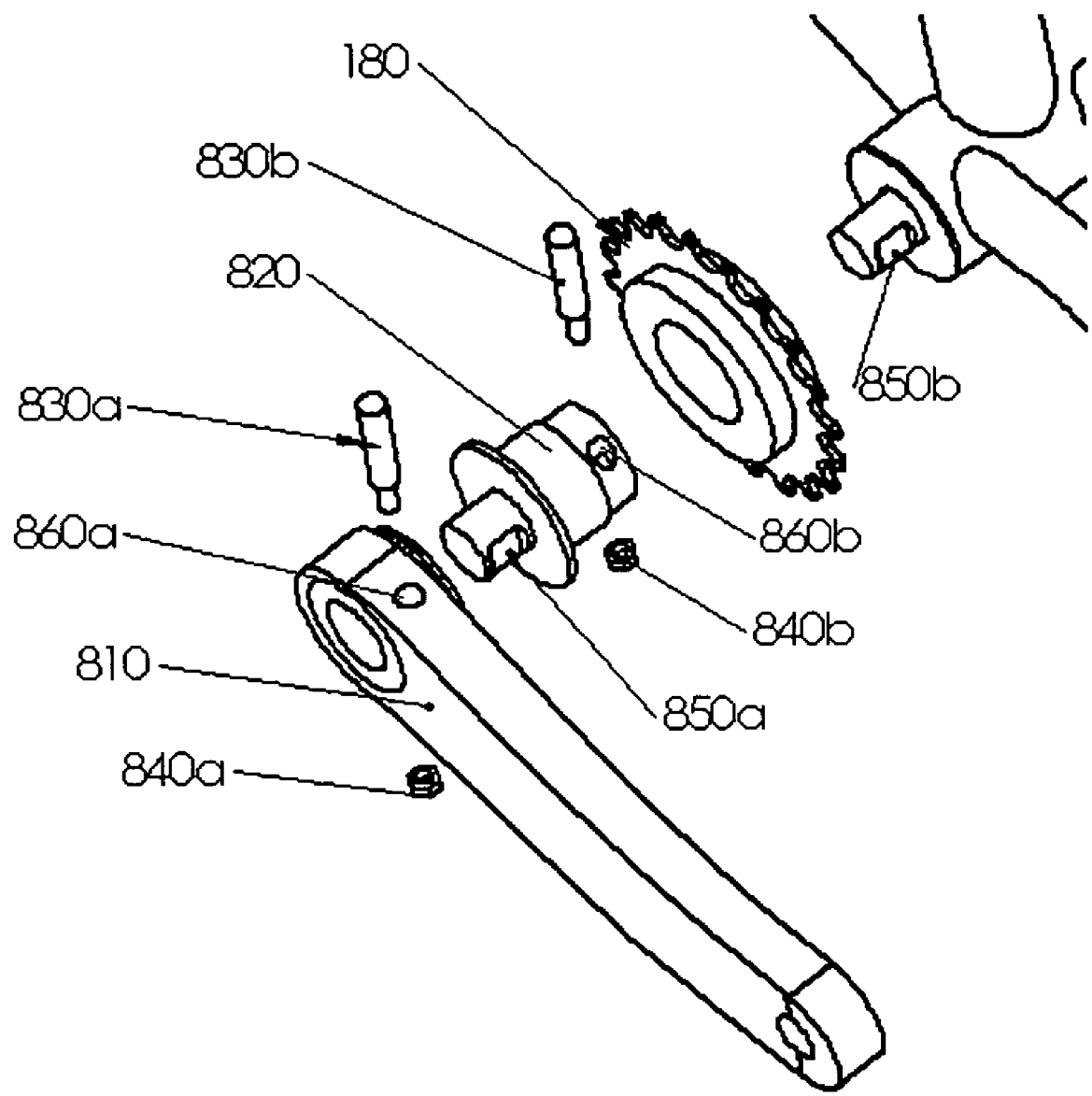

FIG. 8 shows an alternative embodiment for use with cottered style cranks. In this case, extension bushing 820 is fitted with hole 860*b* sized identically with the hole 860*a* found in cottered style crank 810. Cottered cranks are fixed to the crank by means of a cotter pin 830*a* being fitted through hole 860*a* in crank 810. A tapered flat on the cotter pin engages a flat on the axle 850*b*. When extension bushing 820 is used, the cotter and crank are removed from the axle. Freewheel 180 is then threaded onto bushing 820 which is then secured to the axle by inserting the axle into the bushing, fitting cotter pin 830*b* into hole 860*b*, and securing it with nut 840*b*. The crank is then attached to the bushing by inserting the bushing into the crank and fitting cotter pin 830*a* into hole 860*a* and securing it against flat 850*a* by nut 840*a*. As with the alternative embodiment shown in FIG. 7, this embodiment does not require replacement of the crank.

Detailed Description of Embodiment—Threaded Boss on Cottered Crank

An alternative embodiment is also envisioned similar to FIG. 2, where the thread for the freewheel is integrated into a boss on the crank, but the crank is a cottered style.

Detailed Description of Embodiment—Internal Combustion Engine

An alternative embodiment is also envisioned similar to FIG. 1, where the motor 10, is a small internal combustion engine. In this alternative embodiment, freewheel 180 would be lockable for a brief period under rider control for the purpose of starting the engine by applying force to the pedal in a low gear, thus rotating the engine. When the engine starts, the rider would release the freewheel lock, or this could be accomplished automatically.

What is claimed is:

1. A motorized drive system for a bicycle, the bicycle comprising a pedal drive mechanism comprising a crank arm and a crank axle, the drive system supplementing manually pedaling as necessary, the drive system comprising a power source of rotary power;

a single freewheel attached to the manual drive mechanism;

a power transmission means, such that auxiliary power is transmitted by the power transmission means from the power source to the freewheel, and such that auxiliary power is transferred from the freewheel to the pedal drive mechanism, such that there is a rigid joint between the crank arm and the crank axle, and such that the crank arm rotates at all times when auxiliary power is applied.

2. The motorized drive system of claim 1 wherein the single freewheel comprises a female thread; and the crank arm is positioned on the existing crank axle on the left side of the bicycle;

the crank arm having a first end and a second end, the crank arm comprising a male threaded protrusion at the first end, the threaded protrusion being the center of rotation during operation, the protrusion extending, when mounted, toward the center of the bicycle, the protrusion having a male thread to accept a standard single-speed freewheel, and at the second end of the crank, the crank arm having a parallel axis with a female thread to accept a left pedal.

3. The motorized drive system of claim 1, wherein the crank arm is positioned on the left side of the bicycle;

the crank arm has a first end attachable to a bushing, the bushing comprising an outer side and an inner side, such that the outer side of the bushing has a male portion which may be attached to the crank arm, the inner side of the bushing has a male thread which may be threaded into the female thread of the freewheel, and the inner side of the bushing, further includes a female element which engages the crank axle.

\* \* \* \* \*